US012022821B2

(12) United States Patent
Denmon

(10) Patent No.: US 12,022,821 B2
(45) Date of Patent: Jul. 2, 2024

(54) SPINNING WING DECOY APPARATUS

(71) Applicant: Huntwise, Inc., Monroe, LA (US)

(72) Inventor: Terry Denmon, Monroe, LA (US)

(73) Assignee: Huntwise, Inc., Monroe, LA (US)

(*) Notice: Subject to any disclaimer, the term of this patent is extended or adjusted under 35 U.S.C. 154(b) by 44 days.

(21) Appl. No.: 17/170,284

(22) Filed: Feb. 8, 2021

(65) Prior Publication Data

US 2021/0176983 A1 Jun. 17, 2021

Related U.S. Application Data

(63) Continuation of application No. 15/868,365, filed on Jan. 11, 2018, now Pat. No. 10,932,462.

(60) Provisional application No. 62/444,976, filed on Jan. 11, 2017.

(51) Int. Cl.
*A01M 31/06* (2006.01)

(52) U.S. Cl.
CPC ................... *A01M 31/06* (2013.01)

(58) Field of Classification Search
CPC ........................................ A01M 31/06
USPC ............................................. 43/2, 3
See application file for complete search history.

(56) References Cited

U.S. PATENT DOCUMENTS

| | | | | |
|---|---|---|---|---|
| 5,926,990 A * | 7/1999 | Okimoto | ............... | A01M 31/06 43/2 |
| 6,493,980 B1 * | 12/2002 | Richardson | ........... | A01M 31/06 43/3 |
| 6,508,028 B1 * | 1/2003 | Crowe | .................. | A01M 31/06 43/3 |
| 8,188,691 B1 * | 5/2012 | Twohig | ................ | A01M 31/06 43/2 |
| 9,258,993 B2 * | 2/2016 | Szechenyi | ............... | F16H 21/44 |
| 2002/0069571 A1 * | 6/2002 | Price, Sr. | .............. | A01M 31/06 43/3 |
| 2004/0211106 A1 * | 10/2004 | Solomon | ............... | A01M 31/06 43/3 |
| 2009/0272020 A1 * | 11/2009 | Bill | ....................... | A01M 31/06 43/2 |
| 2011/0232154 A1 * | 9/2011 | Crank, Jr. | ............. | A01M 31/06 43/3 |

(Continued)

*Primary Examiner* — Darren W Ark
*Assistant Examiner* — Katelyn T Truong
(74) *Attorney, Agent, or Firm* — Kean Miller LLP; Robert Devin Ricci; Lauren J. Rucinski

(57) ABSTRACT

Disclosed herein is a decoy apparatus comprising: a motor unit securely connected to a base, at least one wing member operatively connected to the motor so as to be rotated by the motor when the motor is engaged, a power source to operate the motor, and a shell that mimics the look of an avian animal that can be incorporated with the motor so as to cause the rotating wing members to appear as if they were the wings of the avian animal. In alternate embodiments, the motor is encased in a motor housing that defines a structure and the shell is a soft body in the shape of a bird with a cavity that is substantially to the size and shape of at least the top of the motor housing such that at least a portion of the motor housing is capable of being inserted into the decoy body, filling a portion of the cavity. In one or more embodiments, the wings are configured to spin at a rate of at least 300 rpm. In one or more embodiments, the decoy apparatus is designed to dampen the vibrations and/or movement of the decoy body caused by the spinning wings.

15 Claims, 12 Drawing Sheets

(56) References Cited

U.S. PATENT DOCUMENTS

| | | | |
|---|---|---|---|
| 2012/0240447 A1* | 9/2012 | Gurner, III | F16M 11/18 |
| | | | 248/176.1 |
| 2014/0144062 A1* | 5/2014 | Barley | A01M 31/06 |
| | | | 43/2 |
| 2015/0027029 A1* | 1/2015 | Mager | A01M 31/06 |
| | | | 43/2 |
| 2017/0027160 A1* | 2/2017 | Latschaw | A01M 31/06 |
| 2017/0280705 A1* | 10/2017 | Burcham | B29C 33/3842 |
| 2017/0332620 A1* | 11/2017 | Noe | G06F 13/385 |

* cited by examiner

SPINNING WING DECOY APPARATUS

CROSS REFERENCE TO RELATED APPLICATIONS

This application is a Continuation application which claims priority to U.S. patent application Ser. No. 15/868,365 entitled "Decoy Apparatus" filed on Jan. 11, 2018, which claims benefit to U.S. Provisional Application No. 62/444,976, entitled Decoy Apparatus, filed on Jan. 11, 2017.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

It should be understood that the drawings are not necessarily to scale; instead, emphasis has been placed upon illustrating the principles of the invention. In addition, in the embodiments depicted herein, like reference numerals in the various drawings refer to identical or near identical structural elements.

BACKGROUND OF THE INVENTION

Figure 1:
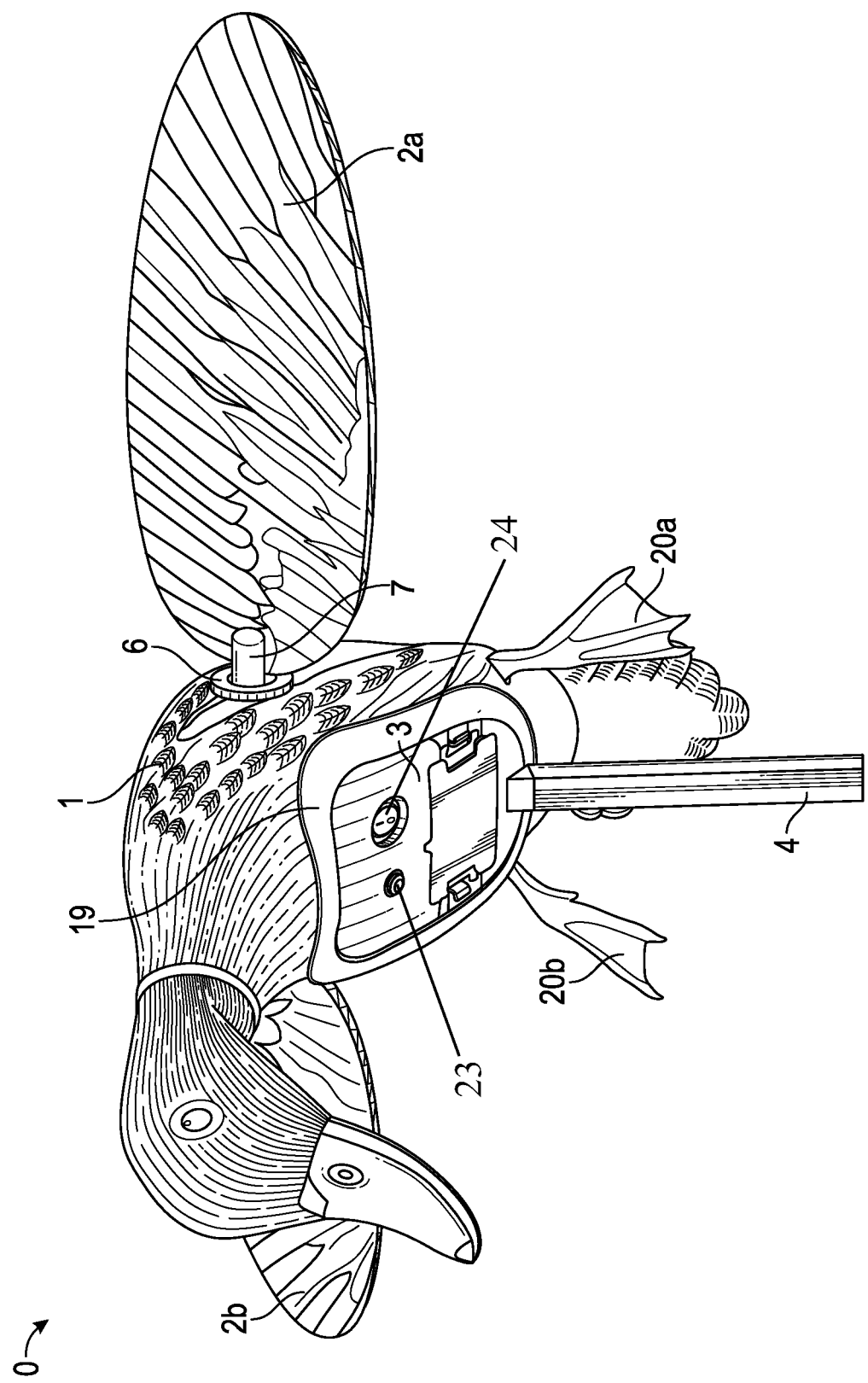
FIG. 1 depicts a fully assembled embodiment of the decoy apparatus.

Outdoor enthusiasts, recreational hunters, and photographers have long recognized that live animals and game, and particularly live waterfowl, are attracted to areas that appear to be inhabited by similar animals. For this reason, people have used decoys, which may refer to artificial animals, to attract live game to within shooting distance of a hunter's rifle, shotgun or other weapon, and within prime viewing distance of photographers and other outdoor enthusiasts such as bird watchers.

Although the term "game" is used herein to describe the animal intended to be attracted or repelled by the decoy (depending on the usage), it is understood that this is not meant to limit the usage to the hunting application as numerous uses are conceived. Conventional decoys have limited success as game, particularly avian game and waterfowls, have become decoy-wise. Migratory birds for example have terrific eye sight at long distances, especially when it comes to the sighing of motion. Traditional, stationary decoys may give the appearance of birds sitting on the water, but they are not particularly noticeable on their own from the perspective of a flying animal at a distance. However, it has been noticed that game animals can see the flashes of a feeding flock of birds from great distances. Therefore, hunters have created and used motion decoys such as those set forth in U.S. Pat. Nos. 6,508,028 and 6,079,140, and which are incorporated herein by reference, to attract game to a prime shooting location. While the motion decoys have experienced wild success in the past, they are not without their own deficiencies. These noticeable and consistent deficiencies evidenced by motion decoys on the market have yet again allowed game animals to become "decoy-wise." For example, while the spinning wing decoys have had historical success, the configuration of these decoys has, until now, caused the decoys to exhibit unnatural vibrations and excessive noise which animals have learned to recognize. Many of the deficiencies were caused by the general configuration of the decoys as the mechanical components were often mounted to the decoy body itself.

The deficiencies also extend beyond the learning curve of game animals. Practically speaking, motion decoys are expensive and are generally limited to a single use in the sense that each decoy is limited to a single type of animal. Additionally, the configuration of conventional motion decoys renders it difficult to switch out power packs in the field and provides minimal waterproof or weatherproof protection to the electronics.

A decoy device is provided herein which aims to provide the motion capabilities desired in spinning wing decoys, while solving one or more of the deficiencies by completely redesigning the decoy such that the motor unit is securely connected to the support and building the decoy around that secure connection. In one or more embodiments, at least the motor is securely attached to a support structure, thereby minimizing the vibratory effects caused by the motor's operation. The present invention changes much of the design to mount the motor, and in some embodiments, the other mechanical and electrical components, in a specially designed housing that not only holds these components securely, but is connected itself directly to the base support system, thereby producing a motion device entirely independent of the animal shaped decoy body. The housing is designed such that the exterior fits snugly into a portion of a hollow, flexible body style of choice. Therefore, in alternate embodiments, one or more removable skins in the shape and look of an animal is employed that can be removably attached to the mechanical spinning wing means, thereby allowing the mechanism to be retrofitted to mimic different animals depending on the intended use. In yet additional embodiments, various wing members can be switched out depending on the intended usage or to match the skin then in use. This configuration produces a smoother, quieter apparatus that can turn the wing members using less power consumption in order to create a more realistic and more adaptive decoy apparatus.

SUMMARY

The present invention relates to a decoy apparatus incorporating a unique combination of structural elements which cooperate in a unique manner to provide a highly effective attractant to avian animals, such as waterfowls, dove, quail and other like animals. The apparatus provides for positioning of the decoy per se on or above the surface of a body of water so that damage to the decoy housing and mechanism employed therein is minimized. The animation of the decoy provides a display which attracts waterfowl to the location of the apparatus, the display being caused by rotating one or more wing members which is powered by an electric motor.

As previously indicated, the present invention changes much of the design of traditional motion decoys to mount the motor, and in some embodiments, the other mechanical and electrical components, in a specially designed housing that not only holds these components securely, but is connected itself directly to the base support system, thereby producing a motion device entirely independent of the animal shaped decoy body. In such embodiments, the housing is designed such that the exterior fits snugly into a portion of a hollow, flexible body style of choice.

In land based use, the positioning of the decoy may remain elevated so as to allow for easier spotting by avian animals or otherwise positioned on the ground in a matter to provide clearance so that the wings can rotate without interference from the ground or other external surfaces.

In one or more embodiments, the decoy apparatus comprises a body substantially in the shape of at least a portion of an avian animal. In a related embodiment, the decoy apparatus comprises the shape and look of a waterfowl, such as a duck.

In a preferred embodiment, the motor is securely connected to an external base to counteract the vibration effect caused by the motor's function, thereby minimizing any unnatural movements caused by the decoy's vibration. This connection, in various embodiments, may either be through direct connection of the motor to the base or indirect connection such as through an intermediary component.

It is preferable in some applications that the electronic components be shielded from the elements. In one or more embodiments, at least one of the electrical components, which may include the motor, power supply, electronic actuators, receivers, transmitters, and connecting wiring, may be partially or fully housed in a housing unit. In alternate embodiments, the housing may be a fully enclosed housing and in others, the housing may merely act as a partial shield to one or more environmental factors. In one or more embodiments, the motor is housed within a substantially weatherproof housing. In alternate embodiments, the housing may be substantially waterproof. In such embodiments, the motor is preferably securely housed within the housing and the housing securely connects the motor to a base support.

In some embodiments, the motor may be connected to the base via a mounting bracket or other intermediary component or adapter. The component or adapter may form part of the motor housing or may be used in lieu of the housing unit depending on the embodiment.

The decoy apparatus 0 may have at least one wing member residing external to the motor housing with a component projecting into the housing that is operatively coupled to the motor such as through the motor's drive shaft to allow the motor to rotate the one or more wing members. In a related embodiment, the motor housing may have two wing members on opposing sides of the housing that each project into the housing, wherein each wing member is operatively coupled to the one or more motors such that the one or more motors can rotate the wing members either independently or concurrently. In yet further related embodiments, one or more wing members can be operatively connected to the motor or motor drive shaft through the one or more wing attachment members 7 or adapter pieces such as drive shaft adapter 8.

In one embodiment, the decoy apparatus will comprise a pair of longitudinally extended, rotatable wings, said wings being substantially flat in their entirety and each having a terminating, distal wing tip opposed to that on the other wing, with one of said wings on one side of said body and the other of said wings on the other side of said body, said wings extending laterally out and away from said body, each terminating in a respective distal wing tip and devoid of any supporting restraint at said distal wing tip, each of said wings being directly attached to a separate wing shaft laterally disposed with respect to said body and extending along a longitudinal axis, said wing shafts not extending beyond said distal wing tips. In other embodiments, the wing members may not be flat, but may be contoured, such as a bowed or semi-helical shape.

The decoy body may be in the shape of an avian animal. In alternate embodiments, the style, look, and/or shape of the decoy may match the look of an avian animal, such as varying types of waterfowl, duck, goose, pigeon, quail, dove, song bird, wading bird, waterbird, predatory bird, heron, sea gull, swans, cranes, egrets, mergansers, loons, cormorants, turkey, shore birds, plume birds, or other animals of the Class Ayes. To accomplish this look, the decoy body may have a body section, a tail section, and a head component opposing the tail section. The decoy body may have features that assist in creating a realistic look, such as, but not limited to feather features, feet, a head, wings, and a paint scheme to match the look of the intended animal.

The decoy body may be substantially hollow in at least one portion thereby defining a cavity. In a preferred embodiment, the cavity, or a portion thereof, will substantially correspond in shape and size to the shape of the housing unit such that at least a portion of the housing unit can be inserted into the cavity defined by the decoy body. In one or more embodiments, the housing unit may provide structural support for the decoy body when inserted into the cavity. In a preferred embodiment, the motor housing and decoy body cavity will be shaped and sized such that the decoy body will fit snugly around at least a portion of the motor housing.

The decoy body may comprise openings or apertures at or near the location where the wing members will project outwards from the housing unit so that the decoy body does not interfere with the rotation of the wing members when the motor is activated. In alternate embodiments, the housing unit may comprise a protruding wall surrounding the connection ports for each wing member, and the decoy body comprises an opening diametrically larger than the protruding walls such that the walls protrude through the apertures in the decoy body thereby securing it in place. In one or more embodiments, the decoy body may be socketed around the protruding walls. Additional securing means such as a threaded cap to correspond with threading on the walls, or a raised reel or ridge may be employed to secure the decoy body onto the housing unit at the connector ports for the wing members.

The decoy body may be hard bodied or substantially soft bodied depending on the embodiment. In a preferred embodiment, the body is formed out of a flexible but resilient material. the decoy body may comprise a rubber, such as a roto-molded rubber or resin polymer. Additionally, the decoy body may be removably connected to the housing such that the decoy body can be removed and replaced with a different decoy body of the same or different avian animal for further function. It is likely that the decoy body will exhibit the most wear and tear as it is an external layer subjected to the elements. Therefore, the interchangeability can allow an older, worn out decoy body to be replaced or to switch another decoy body of a different animal or coloration to change the intended game or function.

The support base to which the motor is mounted may come in many forms depending on the intended usage. The base may comprise a pole structure, a structural rod, a float, a buoy, a wire hang, a chord, or other structural supports. For example, in a marsh environment, the base may be a structural rod inserted into the ground, a floating structure, or another external support such as a tree limb. In other applications such as a predatory bird to scare rodents out of a barn may see a rafter employed as the base.

In a preferred embodiment, the motor is powered by a rechargeable battery, although various power sources are contemplated. In embodiments that are intended for use in remote locations, such as the marsh for hunting, a battery that is interchangeable may be desired.

In another preferred embodiment, the decoy apparatus comprises a transceiver that allows the motor to be remotely controlled with a remote. It is preferred that the transceiver would be housed within the housing unit.

In another preferred embodiment, the motor is a double shaft, direct drive, DC, electric motor located in and mounted to the motor housing unit, and having two, opposed ends, each of said opposed ends having a centrally-located drive end shaft extending laterally out each end of said motor, wherein each of said drive end shafts is inserted directly into a respective said wing shaft and coupled thereto, wherein said motor provides common rotation together, said wings being solely supported off said decoy body by their respective wing shafts coupled to their respective motor drive end shafts, said wings being devoid of any other connections to said body and being solely supported by said motor onto said body.

The motor preferably is capable of a steady rotational rate of 300-1200 rpms (revolutions per minute).

The power supply is a battery in numerous embodiments. It can be chosen from a battery known in the art from 6 volts to 24 volts.

DISCLOSURE

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Furthermore, the described features, structures, or characteristics may be combined in any suitable manner in one or more embodiments unless otherwise noted. In the following description, numerous specific details are provided, such as examples of avian animals, motors, wing members, and connection devices or means. One skilled in the relevant art will recognize, however, that the disclosed Decoy Apparatus may be practiced without one or more of the specific details, or with other methods, components, materials, and so forth. In other instances, well-known structures, materials, or operations are not shown or described in detail to avoid obscuring aspects of the invention.

For illustrative purposes only, a decoy apparatus 0 is described herein comprising, in general, a decoy body 1 substantially in the shape of an avian animal or at least a portion of an animal's body, an electric motor 11, a power unit 10, a housing unit 3 which houses said motor and power unit (i.e., a battery), and a pair of wing members 2 that are operatively coupled to opposing sides of the motor 11 such that the motor can controllably manipulate the wing members residing exterior to the decoy body 1.

Working from the inside out, the apparatus revolves around an electric motor 11 that is capable of operatively manipulating at least one component of the apparatus to give the appearance of a moving animal. In the depicted embodiment, the motor is operatively connected to at least one, preferably two, opposing wing members 2. As depicted, the motor is configured to rotate the wing members 2a,b in the same direction, although different configurations are possible. For example, the motor may be able to cause a different motion such as flapping maneuvers, or the moving component may be located in the tail or front region of the decoy body. Rotatable or spinning wing decoys are a good example of this invention as they have been known in the industry for some time. However, they have, until now, suffered a great defect in that the motors were historically housed on the upper portions of the decoy body separated from the decoy's base support. This support is typically in the form of an external rod that elevates the decoy from the marsh water in the case of a waterfowl decoy. This causes an unnatural wag or vibration to be evidenced in the decoy, which has always plagued those types of decoys.

The instant motion decoy has been reimagined in a wholly different configuration wherein at least the motor 11 is operatively mounted to support base 4 so that motor can transfer the vibratory effect caused by the motor's operation to the support base, thereby allowing the base to damper that vibratory effect. This allows a smooth, more natural looking operation. As such, the decoy apparatus 0 is configured around the motor 11 and motor housing unit 3 to damper the vibratory energy and channels that energy directly to the support base 4.

To accomplish this, the motor can, but does not necessarily need to be connected directly to base support. As depicted, the motor 11 is securely housed within housing unit 3. In this embodiment, the housing unit 3 is designed to perform two key functions: (1) to house and safeguard the electronic components and (2) to provide the support structure of the decoy. Decoys are often subject to the elements; therefore, it is preferable that the housing unit be substantially weatherproof and/or waterproof, although this is not required for all applications. Housing unit 3 comprises an enclosure formed from a hardened shell that is sized to house the motor 11, any electronic chips or actuators (not depicted), and the power unit 10.

Figure 2:
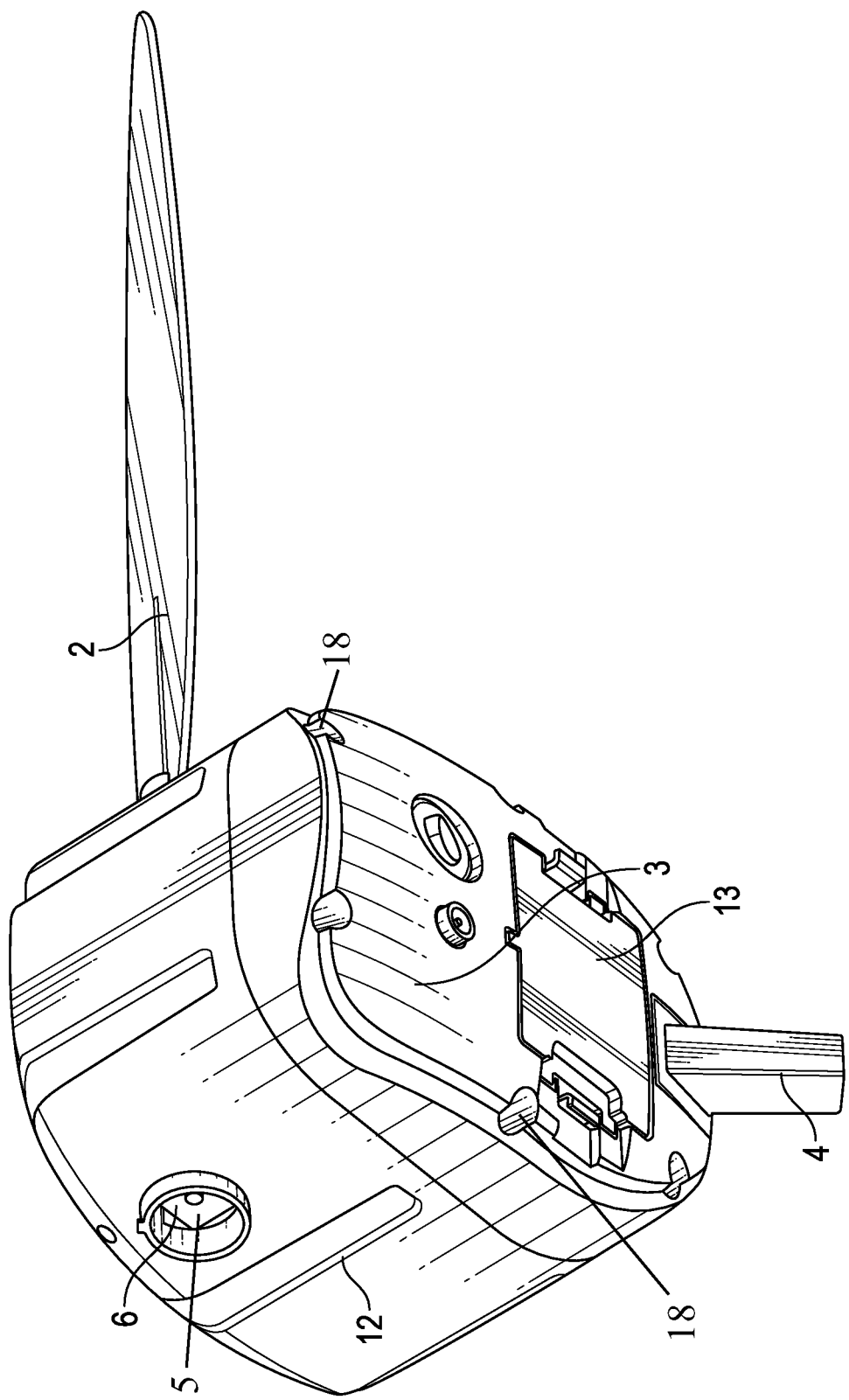
FIG. 2 is a perspective view of the motor housing unit with the decoy body and one wing member removed.
Figure 3:
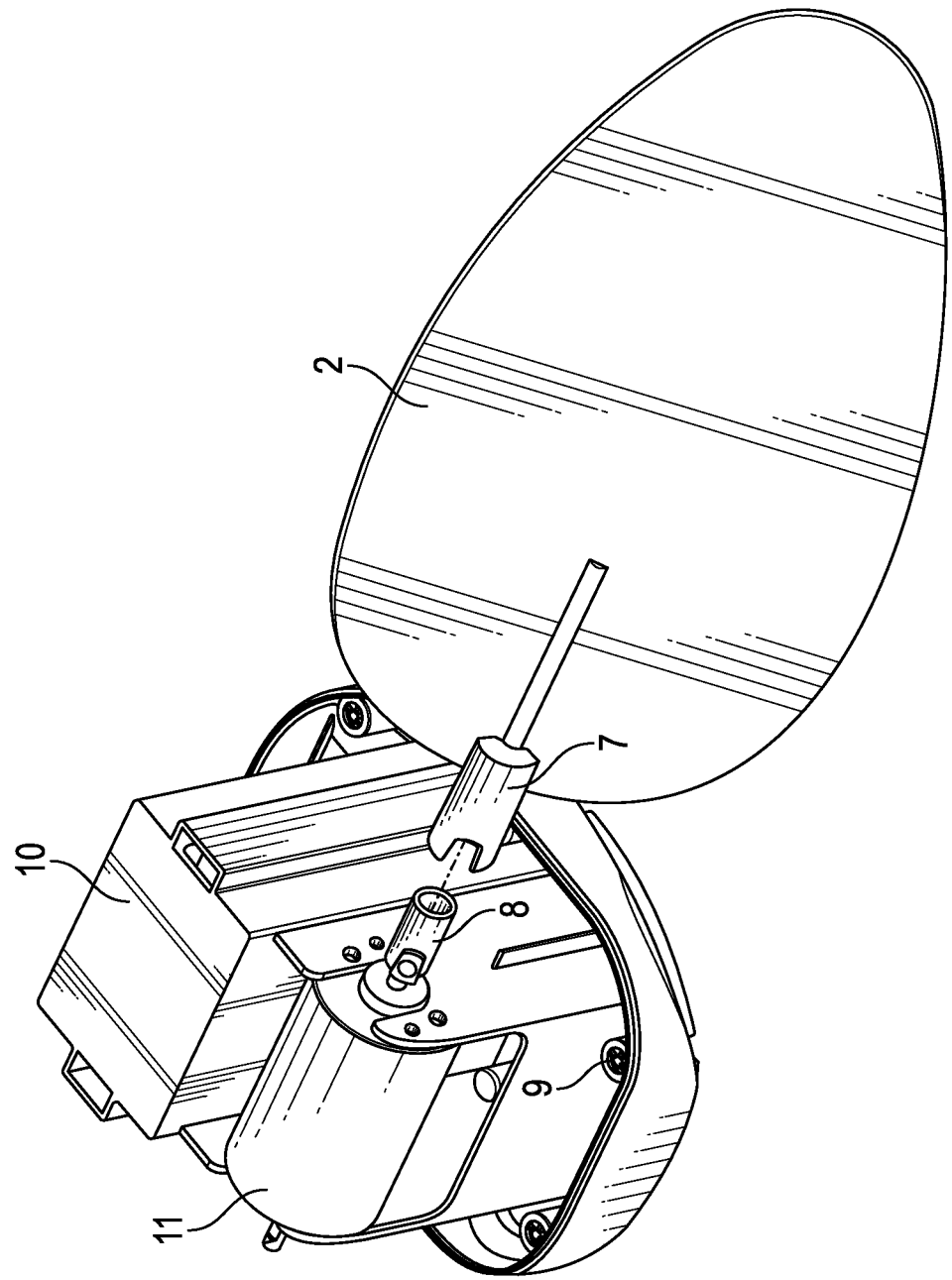
FIG. 3 is a perspective view of the motor housing unit with the portion of the housing unit removed to show the interior components.
Figure 4:
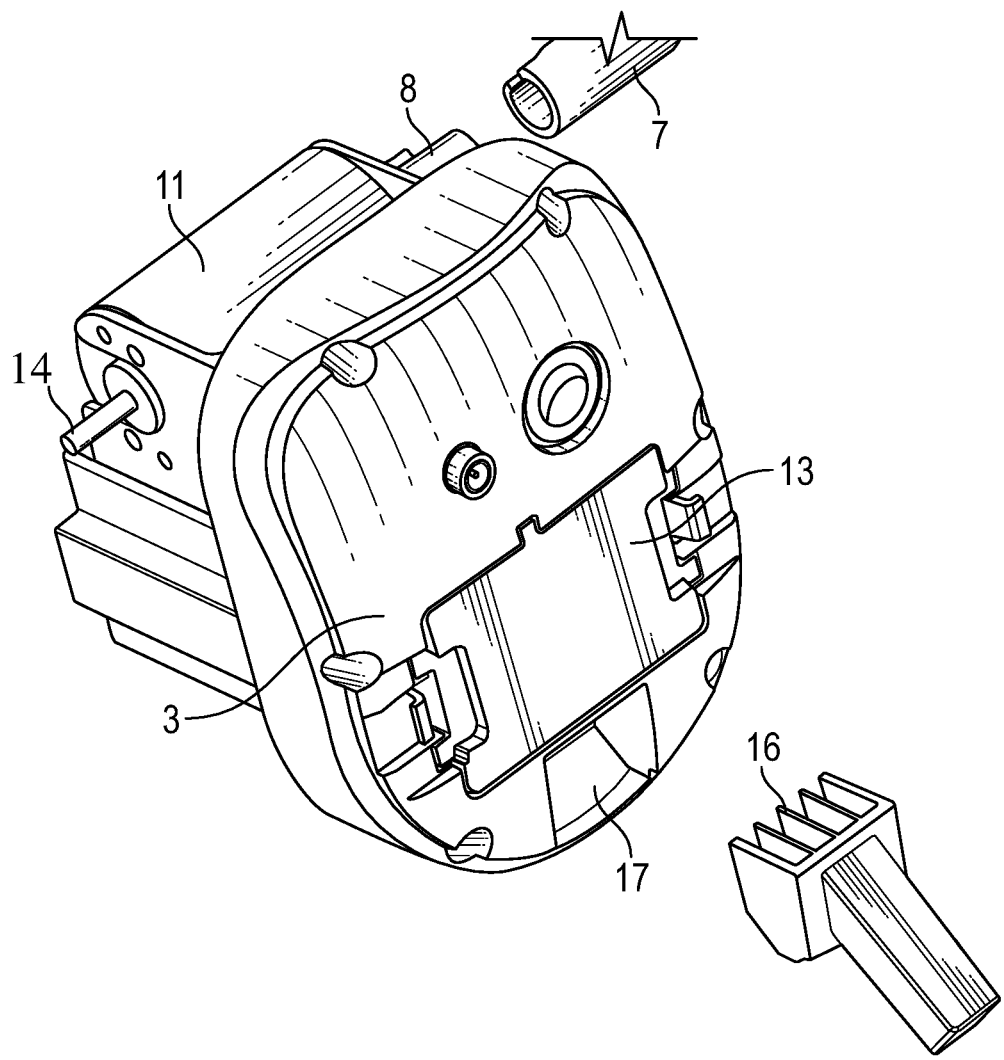
FIG. 4 is a different angle of the image in FIG. 3 to show the base of the housing unit.

Structurally, the shell of the housing unit 3 comprises four side walls connected by a top and a bottom to form a solid unit. It is preferable that the contents of the housing unit be accessible; therefore, either the top, bottom, or one of the side walls may be removable, either wholly or in part, although various other configurations are envisioned to access the interior chamber defined by the housing unit. For example, one or more of the side walls may be partially removable via an access door. In the embodiment depicted in FIGS. 2-4, the housing unit is separated into a top and bottom portion that removably mate with each other to form a solid unit and are secured by releasable fasteners 9, such as screws or clips, although a non-mechanical fitting, such as pressure fitting, may be employed. The portions can be detached from each other to access the electronics contained therein and mated to form the enclosed housing unit 3 in order to protect the electronics from the elements.

Figure 5:
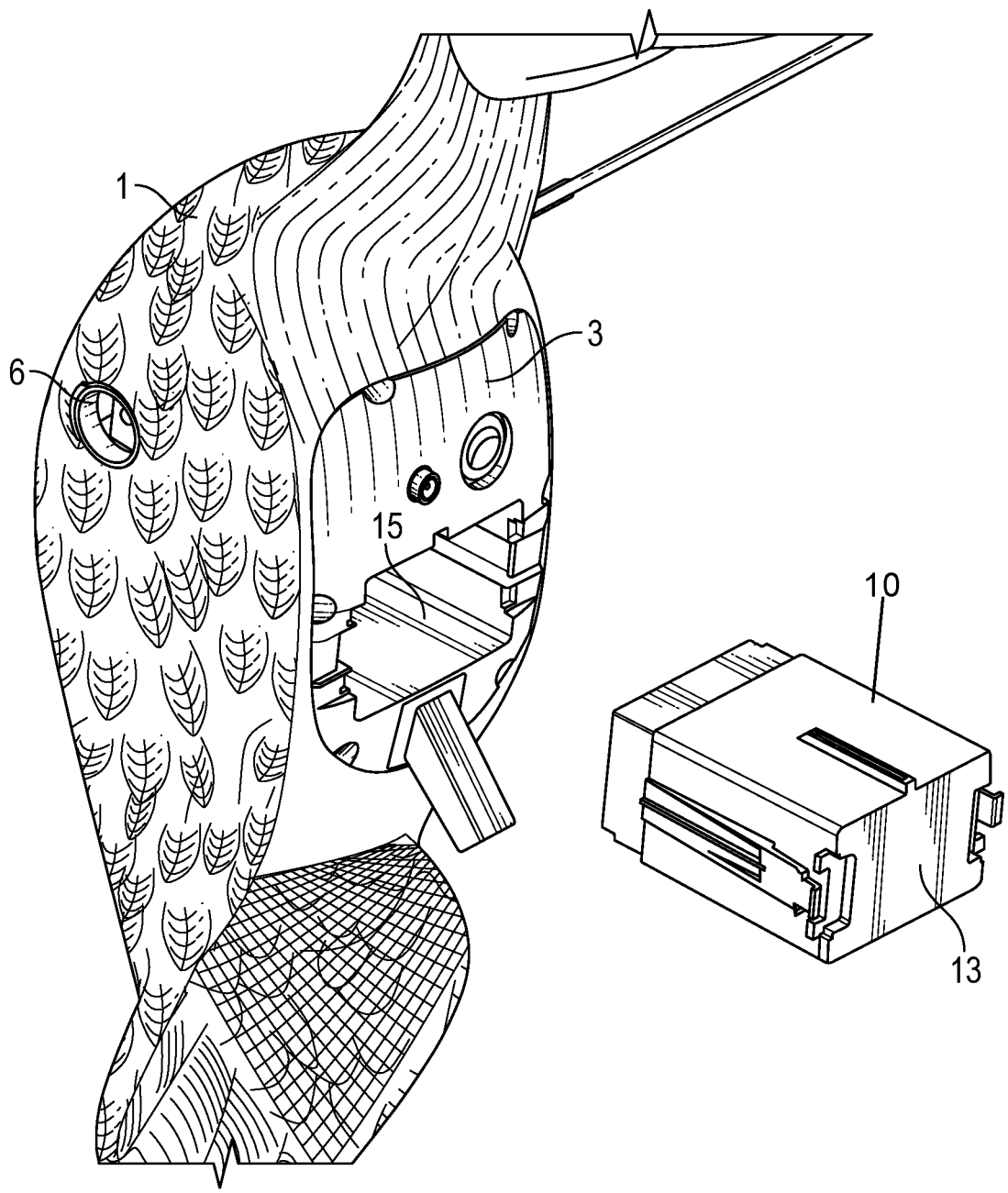
FIG. 5 is a perspective view of the decoy in FIG. 1 with a wing removed and the battery pack ejected from the housing unit to show the battery slot.
Figure 6:
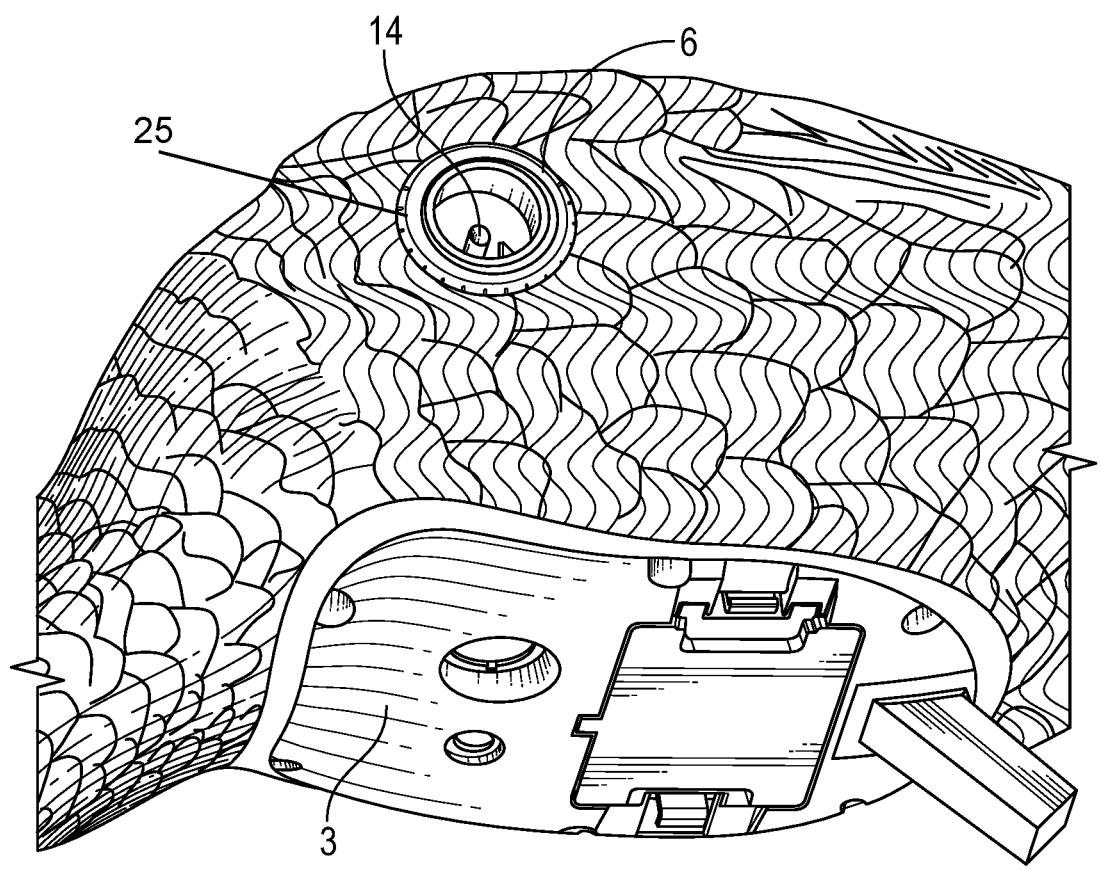
FIG. 6 is a perspective view of FIG. 1 to show the drive shaft sticking through the aperture in the decoy body to which the wing member is attached.
Figure 7:
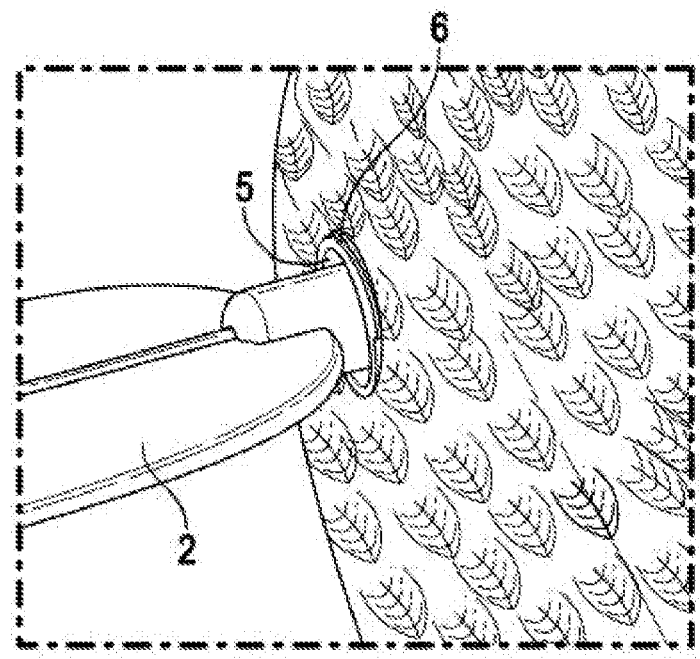
FIG. 7 is a zoomed in view of a connected wing member going into the decoy body.
Figure 9:
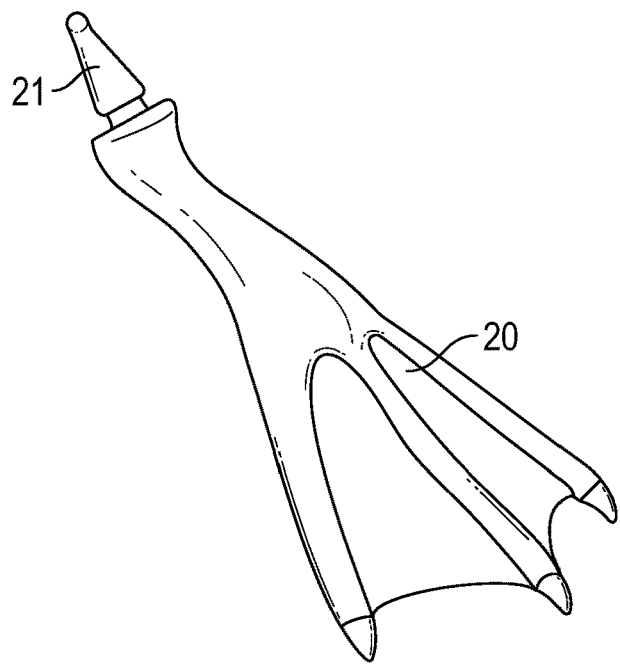
FIG. 9 depicts the feet embellishments.
Figure 8:
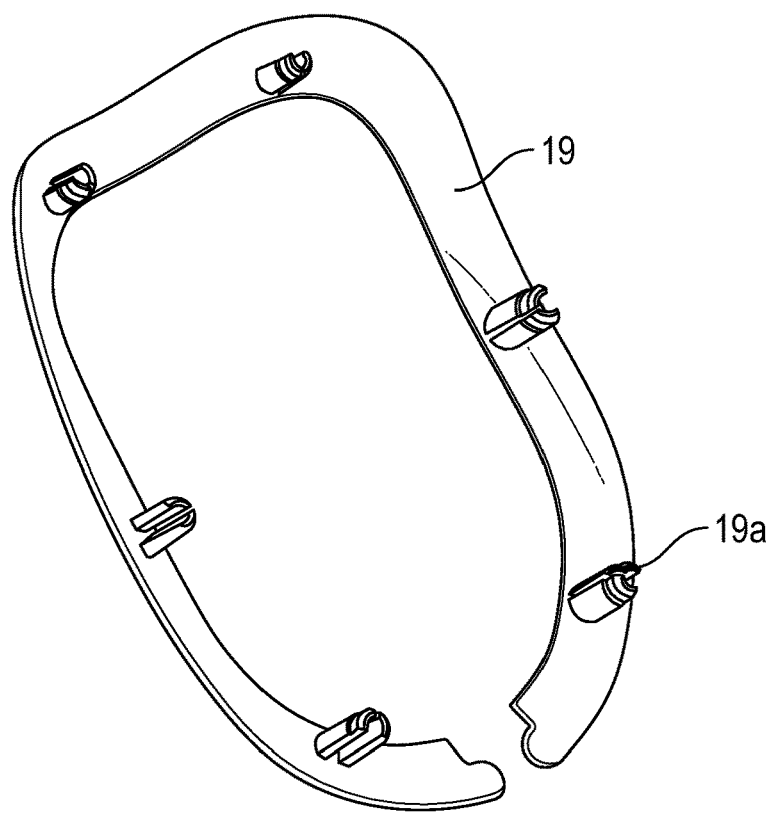
FIG. 8 depicts the decoy-housing fastener, which helps fasten the decoy body to the motor housing unit.
Figure 10:
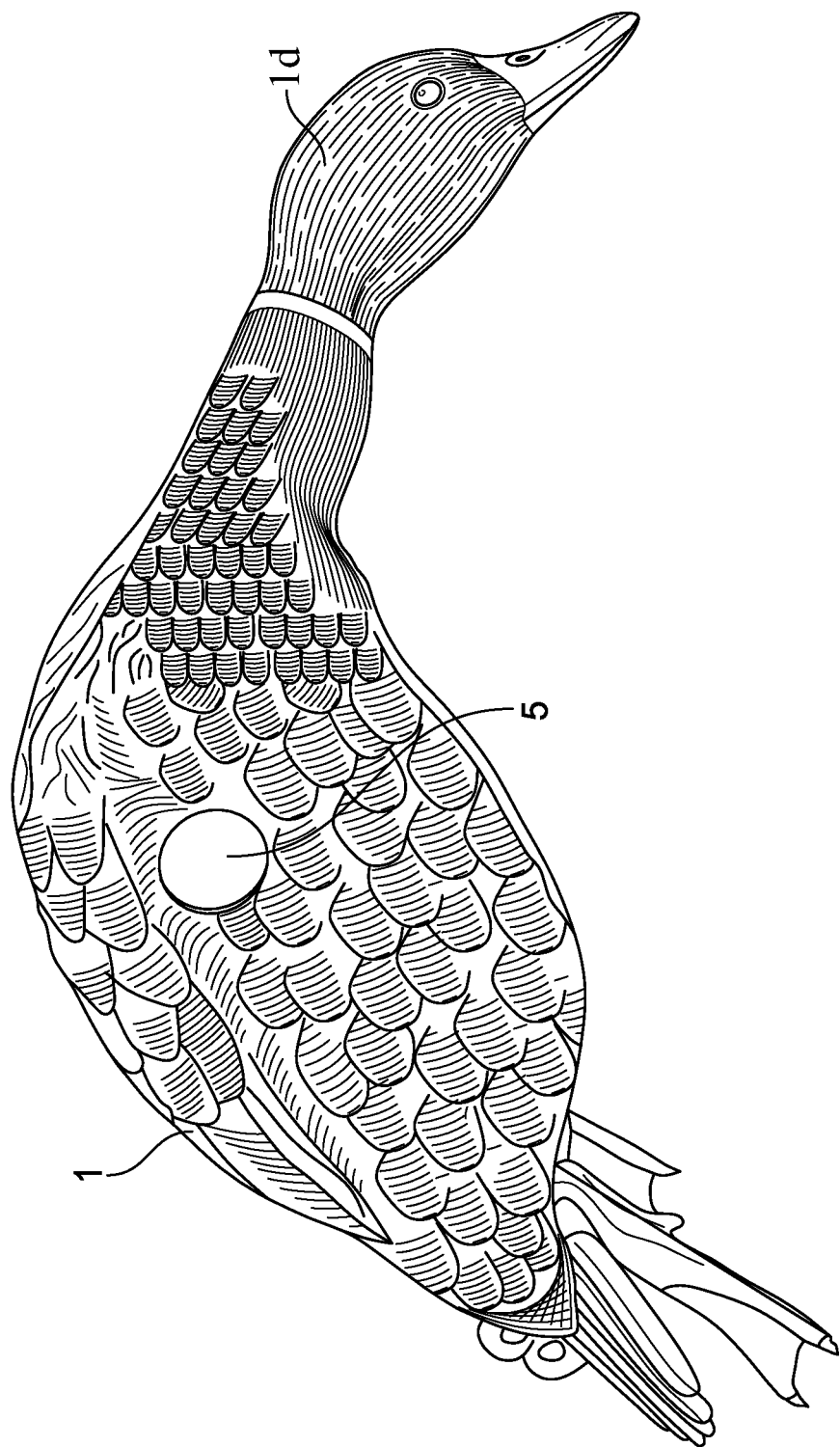
FIGS. 10-12 depict various angles of the decoy body with additional components removed therefrom.
Figure 11:
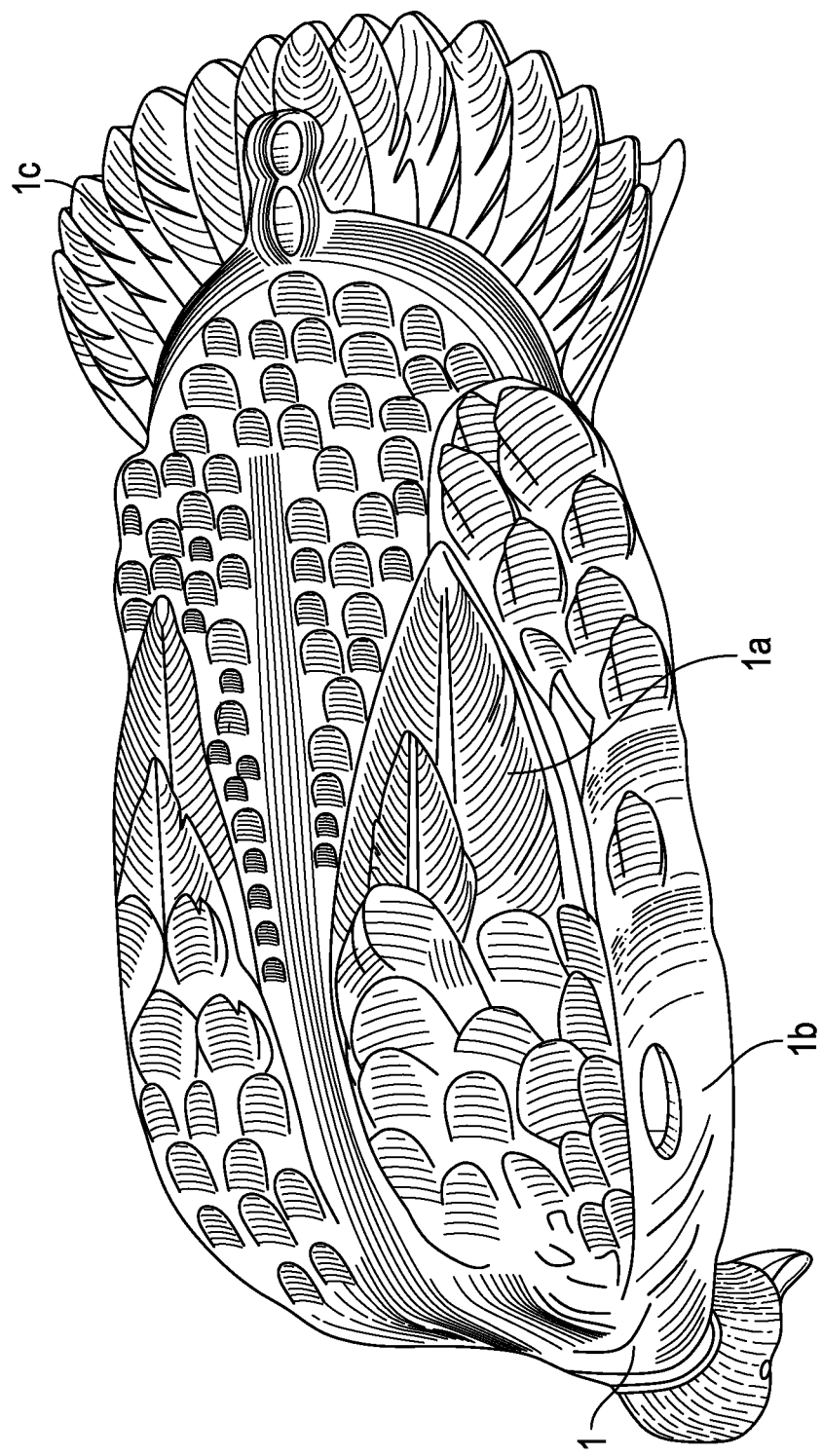
Figure 12:
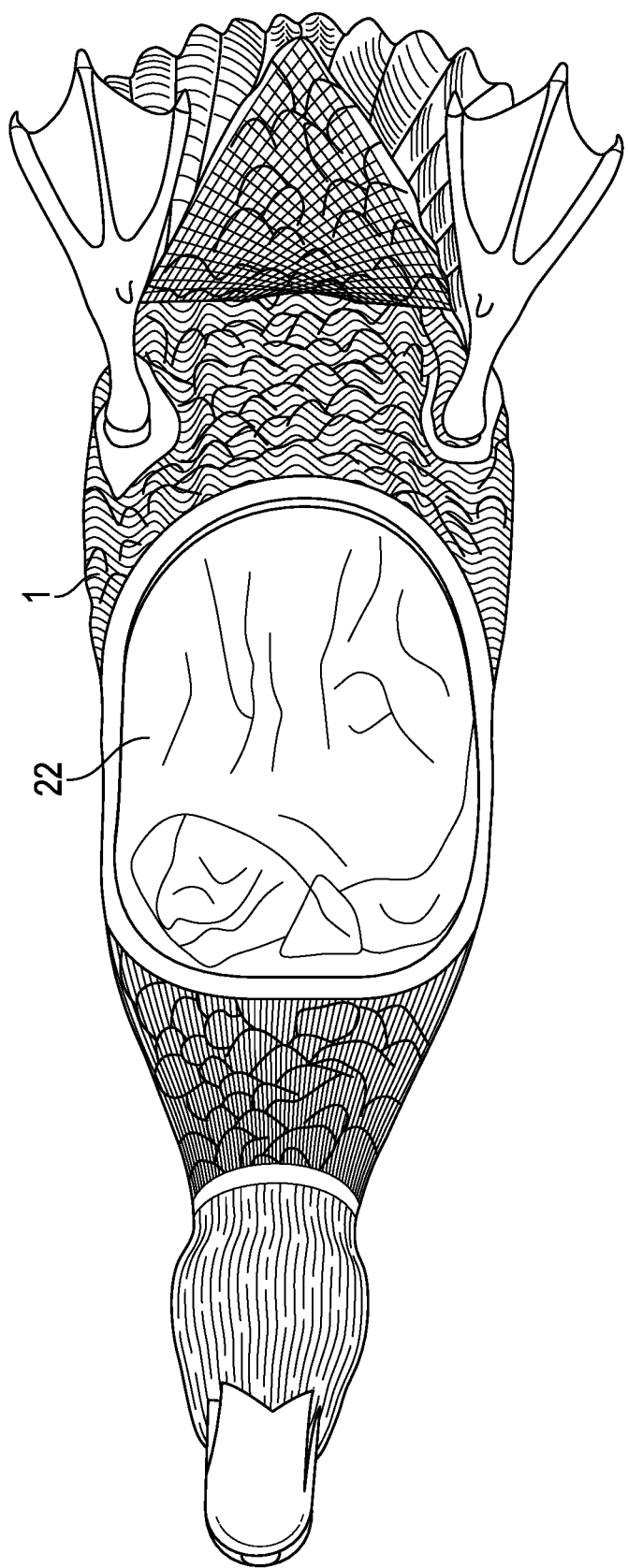
Figure 13:
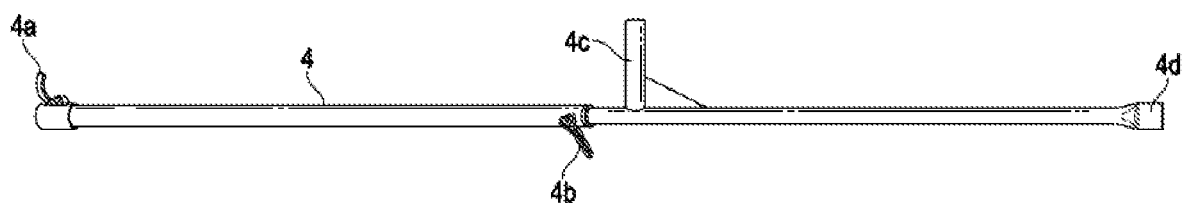
FIG. 13 depicts the base support in the form of a pole.

Turning to FIG. 5, the embodiment is shown with the power unit 10 removed. A removable or interchangeable battery provides substantial benefit that would be obvious to one in the art. However, those with skill in the art would likewise recognize that this would necessitate the housing have an opening to accommodate the battery. This opening exposes the inside chamber of the housing to the elements. To balance maximum protection, and thus longevity, of the key electronic components with the ability to use a removable and interchangeable power supply, the depicted housing unit 3 houses the power unit 10 in battery port or slot 15, which is a bay that is separated from the other electronic components by a wall. Battery port of slot 15 is substantially waterproof; therefore, even if water enters battery port or slot 15, it will be prevented from seeping into housing unit 3 and the electronic components contained therein. Power unit 10 has a hard exterior shell or cover 13 to protect it from damage. Depicted shell or cover 13 is made out of the same materials as the housing unit 3 for uniformity, although this is not necessary.

As will be explained below, the depicted decoy apparatus 0 is designed so that the decoy body 1 slides over and onto the housing unit 3; therefore, it is desirable that the power unit 10 and actuator on/off switch 24 be located in the bottom of the housing unit so that a user can access both without having to greatly manipulate the decoy. Likewise, in applications where the decoy power source is rechargeable, a charging port 23 may be installed directly into the exterior of the housing unit 3 that is in electronic communication with the rechargeable power source.

Two wing openings 5 are formed in the housing unit 3, one on each of two opposing side walls, to allow for the wing members 2a,b to be operatively connected to the motor 11 to allow for rotation. In one or more embodiments, the decoy apparatus may further comprises a transceiver. The transceiver allows the motor 11 to be actuated remotely through a remote in electronic communication with the transceiver. In this embodiment, it is preferred that the transceiver would be housed within the housing unit.

The motor rotates drive shaft 14, which extends outwards from the motor 11. In the preferred embodiment depicted, drive shaft 14 extends from the motor on two opposing sides. Drive shaft 14 extends outwards from the motor, through the wing openings 5 to a terminating point. Wing members 2 are connected to the external, terminating end of the drive shaft 14 opposite the motor. It is preferred that the drive shaft be of substantial length to allow the wing member 2, to rotate without contacting the housing unit 3 and, in this embodiment, the decoy body 1 which will be placed over the housing unit. Wing openings 5 are further defined by cylindrical walls, wing orifice lip fastener 6, that protrude from the housing unit 3. When the decoy body 1 is placed on the housing unit 3, the wing orifice lip fasteners 6, will line up with and mate with openings in the decoy apparatus to help secure the decoy apparatus to the housing unit.

The decoy body 1 is a rigid but flexible structure that externally is substantially in the shape of an avian animal (i.e., a bird). As depicted, the decoy body resembles the look of a waterfowl. The decoy body comprises a top section 1a, side walls 1b extending downward from top section, and a tail section 1c connected to the back end of the top section 1a and a head section 1d. The decoy body 1 may further comprise additional components such as feet 20a, 20b to help create the look of a live animal. The feet may be connected to the decoy body 1 in any suitable manner. As depicted, the feet comprise a foot connector 21 that may be inserted into a corresponding opening on the decoy body 1, which allows the feet to hang in a realistic manner.

The decoy body 1 comprises a shell or skin that defines a cavity 22 shaped to accommodate at least a portion of the housing unit 3. In embodiments where the decoy body is soft bodied, such as a roto-molded skin, the user will deform the body to open the cavity, thereby allowing the user to slide the decoy body over the top of the housing unit and down to cover at least a portion of the housing unit, if not substantially all of it. The decoy body has side apertures or slots that correspond with the wing orifice lip fasteners 6, the protruding walls surrounding the side wall slots on the housing unit. The decoy body is manipulated to line up the apertures in the decoy body with the protruding walls and then released so that it returns to its resting state (i.e., natural form) with the wing orifice lip fasteners 6 extending through the decoy body 1 to help fasten and secure the decoy body 1 in place around the housing unit 3. In alternate embodiments, the protruding walls may have a further securing means such as a raised ridge that would catch the decoy side wall, preventing it from disengaging. In yet alternate embodiments, the wing orifice lip fasteners 6 of the protruding walls may be externally threaded and an internally threaded circular cap 25 can be secured around the walls once the decoy body is in place. The depicted housing unit 3 comprises contours 12 which help facilitate the fit and grip of the decoy body 1 onto the housing unit 3.

With the decoy body substantially covering the housing unit, the decoy is mostly constructed. To further secure the decoy body 1 in place, a decoy body fastener 19 can be snapped into and around the bottom of the unit by placing fastener clips 19a into the fastener slots 18. Doing so will pinch the decoy body to the housing unit and covering the seam between the two. It should also be noted that while the decoy body's primary function is to provide the appearance of the intended animal, the body also acts to further waterproof the housing by preventing water from contacting or pooling on its surfaces. By sealing the seam, the decoy body will be able to better prevent seepage of water into the decoy.

It should be understood that a hard bodied or permanently attached decoy body can be employed. However, an advantage of the removable, soft body decoy is that the user can switch different decoy bodies (or skins) to suit the particular need of the hunt or observation activity without having to purchase multiple motor apparatuses, which is the most costly component of the decoy to create.

Each wing member 2 is an elongated structure substantially in the shape of an intended bird's wing. They may be made of numerous materials and may either be flat pieces or contoured, such as semi-helical structures, to help catch the wind. It is preferable that the wings have varying colorations such that light will strike the wing while it is in motion, creating the look of a flash which can be seen by the intended animal(s). The wing member has two ends: a base end wherein the wing member comprises wing connector with a magnetic fastener and a distal end that is the outermost tip. On the base end, the wing members comprise a wing connector which is a magnetic connector as is known in the art. The wing connectors are attachable and detachable to allow for the housing unit to be inserted into the decoy body, to allow for ease of storage, and to allow a user to change out or replace different wings depending on the intended use.

The housing unit 3 is designed to securely fasten the motor to the support base 4. The depicted support base 4 is a pole member with a connector 4a on one end, a wedge 4d on the opposing side, and a pushing handle 4c, as has been used in the art. The depicted embodiment shows a two-piece pole that is connected by attachment piece 4b. The base of the housing unit comprises a base slot 17 into which a base support connector 16 is positioned. The base support connector 16 sockets into the support base 4 pole member, wherein it is fastened by base pole connector 4a. It is preferred that the support base 4 is positioned in relation to the motor such that the motor will be securely connected to the support base when the housing unit is mounted thereto.

For the purpose of understanding the Decoy Apparatus, references are made in the text to exemplary embodiments of a Decoy Apparatus, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the Decoy Apparatus may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

The invention claimed is:

1. A spinning wing decoy apparatus comprising:
 a. a decoy body consisting of a single molded sleeve and substantially in the shape of at least a portion of an avian animal and comprising a closed, contiguous top section;
 b. a motor wherein an at least one wing member is operatively connected to said motor so as to spin when the motor is actuated; and
 c. a base support, wherein the motor is either directly mounted to the base support or indirectly mounted to the base support through an intermediary member in a manner so when said motor is actuated, vibrational forces of said spinning at least one wing member are dampened
 wherein each said at least one wing member extends beyond said decoy body;
 said decoy body comprises at least one aperture that corresponds with a location of said each at least one wing member such that said each at least one wing member is located substantially external to the decoy body, but connected to said motor through a connection means that traverses through the corresponding aperture;
 said housing unit further comprises a pair of lip fasteners, each of said pair of lip fasteners extending outwards from an opposite side wall of said housing unit such that when the decoy body is lowered onto the housing unit, said pair of lip fasteners each extend through said respective apertures to help secure said decoy body in place, and wherein each said at least one wing member extends through each said at least one lip fastener.

2. The spinning wing decoy apparatus of claim 1 wherein said intermediary member comprises a housing unit and wherein said motor is at least partially encased by said housing unit.

3. The spinning wing decoy apparatus of claim 2 wherein said decoy body comprises a flexible but resilient material shaped to define an internal cavity, wherein at least a portion of said housing unit corresponds in shape and size to said internal cavity such that said decoy body can be placed around the portion of said housing unit.

4. The spinning wing decoy apparatus of claim 3 wherein said decoy body comprises a material selected from the group comprising plastics, rubber, resin, or a polymer.

5. The spinning wing decoy apparatus of claim 1 wherein each said lip fastener is externally threaded and an internally threaded cap is screwed onto each said lip fastener after said decoy body is attached to the housing unit to secure the decoy body to the housing unit such that said body is not secured to said motor directly.

6. The spinning wing decoy apparatus of claim 1 further comprising a transceiver paired with a remote and a power supply, wherein said motor is connected to the power supply and transceiver, and wherein said transceiver is operatively coupled to said motor and power supply to allow said remote to turn the motor on and off.

7. A spinning wing decoy apparatus comprising:
 a. a decoy body substantially in the shape of at least a portion of an avian animal comprising a shell and a cavity defined by the shell;
 b. a housing unit bottom portion
 c. a motor connected to said housing unit bottom portion, wherein said motor removably fits within said cavity but that does not contact said decoy body such that vibrations transferred through the motor to said decoy body are minimized;
 d. at least one wing member at least partially exterior to said decoy body and operatively connected to said motor so as to rotate when the motor is actuated; and
 e. a base support connected to said motor;
 wherein each said at least one wing member extends beyond said decoy body;

said decoy body comprises at least one aperture that corresponds with a location of said each at least one wing member connected to said motor through a connection means that traverses through the corresponding aperture;

said housing unit further comprises a pair of lip fasteners, each of said pair of lip fasteners extending outwards from an opposite side wall of said housing unit such that when the decoy body is lowered onto the housing unit, said pair of lip fasteners each extend through said respective apertures to help secure said decoy body in place, and wherein each said at least one wing member extends through each said at least one lip fastener.

8. The spinning wing decoy apparatus as in claim 7 wherein said decoy body is removably attached to each of said pair of lip fastener such that it can be replaced with a second decoy body.

9. The spinning wing decoy apparatus as in claim 7 comprising two said at least one wing members that extend through said decoy body and wherein said motor comprises a drive shaft extending outwards from the motor on two opposing ends of the motor and one of said at least two wing members is connected to one of said external ends of said drive shaft and the other of said at least two wing members is connected to the other of said external ends of said drive shaft such that each said at least two wing members are manipulated by the motor, causing each said at least two wing members to spin.

10. The spinning wing decoy apparatus as in claim 9 wherein said at least two wing members each comprise a horizontal axis about which each said at least two wing members spins.

11. The spinning wing decoy apparatus of claim 9 wherein said motor comprises a double shaft, direct drive, DC, electric motor located in and mounted on said housing unit and having two, opposed ends, each of said opposed ends having a centrally-located drive end shaft extending laterally out each end of said motor, wherein each of said drive end shafts is inserted into a respective said wing member, either directly or through a connector, and coupled thereto, wherein said motor provides common rotation together, said wings being solely supported on said decoy body by their respective connections coupled to their respective motor drive end shafts, said wings being devoid of any other connections to said decoy body and being solely supported by said motor onto said decoy body.

12. The spinning wing decoy apparatus of claim 7 wherein said decoy body comprises a flexible, but resilient material that can be manipulated from its resting state to permit the entering of the housing unit into the cavity, but will substantially return to its resting state when no longer acted upon.

13. A spinning wing decoy apparatus comprising:
   a. a decoy body substantially in the shape of at least a portion of a waterfowl comprising a shell and a cavity defined by the shell;
   b. a motor located within a housing unit, wherein said housing unit removably fits within said cavity and forms a watertight seal of said cavity;
   c. at least one spinning wing member exterior to said housing unit operatively connected to said motor through said housing unit so as to spin when said motor is actuated; and
   d. a buoyant base connected to said motor so as to dampen the vibration effects of the spinning of said at least one spinning wing member when said motor is actuated;
   said decoy body comprises at least one aperture that corresponds with a location of said each at least one spinning wing member such that said each at least one spinning wing member is connected to said motor through a connection means that traverses through the corresponding aperture;
   said housing unit further comprises a pair of lip fasteners, each of said pair of lip fasteners extending outwards from an opposite side wall of said housing unit such that when the decoy body is lowered onto the housing unit, said pair of lip fasteners each extend through said respective apertures to help secure said decoy body in place, and wherein each said at least one spinning wing member extends through each said at least one lip fastener.

14. The spinning wing decoy apparatus of claim 13 further comprising a power unit.

15. The spinning wing decoy apparatus of claim 14 wherein said housing unit further comprises a battery port that is substantially waterproof.

* * * * *